(12) United States Patent
Heyder et al.

(10) Patent No.: US 10,981,618 B2
(45) Date of Patent: Apr. 20, 2021

(54) BEARING RETAINING ELEMENT

(71) Applicant: Canyon Bicycles GmbH, Koblenz (DE)

(72) Inventors: Daniel Heyder, Alfter (DE); Lukas Schuchnigg, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 205 days.

(21) Appl. No.: 16/170,448

(22) Filed: Oct. 25, 2018

(65) Prior Publication Data

US 2019/0128328 A1 May 2, 2019

(30) Foreign Application Priority Data

Oct. 26, 2017 (DE) .................. 20 2017 005 537.6

(51) Int. Cl.
*B62K 19/32* (2006.01)
*B62K 21/06* (2006.01)
*F16C 35/067* (2006.01)

(52) U.S. Cl.
CPC ............ *B62K 19/32* (2013.01); *B62K 21/06* (2013.01); *F16C 35/067* (2013.01); *F16C 2326/26* (2013.01)

(58) Field of Classification Search
CPC ........ B62K 19/32; B62K 21/06; F16C 35/067
See application file for complete search history.

(56) References Cited

U.S. PATENT DOCUMENTS

| 5,387,255 | A | 2/1995 | Chiang |
| 5,445,047 | A * | 8/1995 | Chi .......................... B62J 11/00 |
| | | | 280/278 |
| 6,019,017 | A | 2/2000 | Lin |
| 6,167,780 | B1 | 1/2001 | Chen |
| 8,087,685 | B2 * | 1/2012 | Weidner ................ F16C 29/126 |
| | | | 280/279 |
| 9,475,539 | B2 * | 10/2016 | Ehrhard ................. B62K 21/00 |
| 9,663,179 | B2 * | 5/2017 | Wagner .................. B62K 21/18 |
| 10,012,261 | B2 * | 7/2018 | Jungeberg ........... F16C 11/0695 |
| 2010/0096830 | A1 | 4/2010 | Tange |

FOREIGN PATENT DOCUMENTS

| DE | 29703506 U1 | 6/1997 |
| DE | 19940969 A1 | 11/2000 |
| EP | 1879788 A1 | 1/2008 |
| FR | 2692221 A1 | 12/1993 |
| FR | 2815928 B1 | 1/2003 |
| JP | H04135892 U | 12/1992 |

* cited by examiner

*Primary Examiner* — Kevin Hurley
(74) *Attorney, Agent, or Firm* — The Webb Law Firm

(57) ABSTRACT

A bearing retaining element for bicycle headset bearings includes a basic element which, in a mounted state, at least partly surrounds a steerer tube. The basic element retains a clamping element which also, in the mounted state, at least partly surrounds the steerer tube. Further, a clamping member in particular configured as a grub screw is provided which acts upon the clamping element for clampingly fixing the clamping element to the steerer tube.

11 Claims, 1 Drawing Sheet

BEARING RETAINING ELEMENT

CROSS-REFERENCE TO RELATED APPLICATION

This application claims priority to German Utility Model Application No. 20 2017 005 537.6 filed Oct. 26, 2017, the disclosure of which is hereby incorporated in its entirety by reference.

BACKGROUND OF THE INVENTION

Field of the Invention

The invention relates to a bearing retaining element for bicycle headset bearings.

Description of Related Art

In a fork tube of a bicycle frame the steerer tube of a front wheel fork is pivotably supported via headset bearings or headtube bearings. Conventional headsets include a lower as well as an upper headset bearing which are arranged at the lower and the upper end, respectively, of the fork tube of the frame. The two bearings of the headset must be biased towards each other. Biasing is performed with the aid of a handlebar stem. For this purpose, the handlebar stem is normally placed upon the steerer tube from above. By adjusting the stem in the longitudinal direction of the steerer tube the two headset bearings are biased. Via screws normally extending tangentially to the steerer tube the stem is then clampingly fastened to the steerer tube.

Such biasing of the headset bearings is disadvantageous in that in the case of dismounting of the stem for the purpose of exchanging the stem, for example, or for transporting purposes, the bearing clearance or the bias of the two headset bearings has to be readjusted during the subsequent mounting of the stem, for example. In doing so, there is always the risk that in the case of excessive biasing the bearings are damaged due to too high a friction in the bearings. When the bearings are biased to too low an extent, the bearings may become worn, and safe retaining of the steerer tube in the fork tube is not ensured. It is therefore always recommended that mounting of the stem and thus adjustment of the two headset bearings is only performed by one skilled in the art. In some countries this is even obligatory.

SUMMARY OF THE INVENTION

It is an object of the invention to provide a bearing retaining element for bicycle headset bearings, which allows an adjustment of the headset bearings to remain unchanged even during dismounting of the stem, and/or to be performed with the stem being removed.

According to the invention, this object is achieved with a bearing retaining element as described herein.

The bearing retaining element according to the invention for bicycle headset bearings includes a basic element which, in the mounted state, at least partly, preferably completely surrounds a steerer tube. The basic element retains a clamping element. In the mounted state, the clamping element partly, in particular completely surrounds a steerer tube. Preferably, the clamping element is arranged inside the basic element and/or at least partly surrounded by the basic element. In addition, a clamping means, which may include locking elements, for example, and which, in a particularly preferred embodiment, is a screw, is connected with the basic element. With the aid of the clamping means the clamping element can be clampingly fixed to the steerer tube. Thus the clamping means acts upon the clamping element for clampingly fixing the clamping element to the steerer tube.

Since the bearing retaining element according to the invention can be clampingly fixed to the steerer tube, it is possible to remove the stem without changing the bias or the adjustment of the headset bearings. Thus the stem can subsequently be mounted again, wherein the headset bearings need not be newly biased or adjusted. This is advantageous when exchanging the stems, for example. This is also possible even when a bicycle is to be transported without the stem in particular due to lack of space, since the stem can be mounted without any technical knowledge because the headset bearings need not be adjusted. This is in particular advantageous when shipping bicycles in transport boxes. In a particularly preferred embodiment of the bearing retaining element according to the invention the basic element has a closed contour and thus, in the mounted state, completely surrounds the steerer tube. The basic element may also serve as a cover element for the upper headset bearing and thus protects the headset from dirt, for example.

Preferably, the basic element includes an accommodation projection for accommodating the clamping means. The accommodation projection is preferably integrally formed with the fastening element and forms a thickened portion in which the clamping means can at least partly be accommodated. Preferably, the clamping means is completely accommodated in the accommodation projection. It is further preferred that the accommodation projection includes a thread for accommodating a clamping means which in particular is a screw. It is particularly preferred that the screw is a grub screw.

In a particularly preferred aspect of the invention, the clamping element includes a clamping projection. The clamping projection is preferably integrally connected or formed with the clamping element. The clamping means acts upon the clamping projection. The clamping means in particular exerts a compressive force upon the clamping projection such that the clamping element is deformed and thus the clamping element is clampingly fixed to the steerer tube.

For this purpose, it is further preferred that the clamping projection includes a contact surface for the clamping means which is in particular a grub screw. The contact surface preferably extends perpendicularly to the clamping direction, i.e. perpendicularly to the direction of movement of the clamping means. The contact surface has an angle of 90°+/−20° to the clamping direction.

In addition, it is preferred that the clamping element is at least partly elastically deformable. This ensures that the clamping element at least partly, in particular completely rests upon the steerer tube such that good transmission of the clamping force is ensured.

Preferably, the clamping element is connected with the basic element via ribs. In particular, at least two, preferably three ribs are provided. According to a preferred embodiment, the basic element and the clamping element are formed integrally with each other. Preferably, the clamping projection is also integrally connected with the clamping element and the accommodation projection is integrally connected with the basic element. In this embodiment, the bearing retaining element includes only two components since only the clamping means, in particular the grub screw, is provided in addition to the integrally formed clamping element and basic element.

For improving the deformability or movability of the clamping element it is possible that in at least one or a plurality of ribs hinges are provided. The hinge axis preferably essentially extends in parallel to the steerer tube in the mounted state.

BRIEF DESCRIPTION OF THE DRAWINGS

Hereunder the invention is explained in detail on the basis of preferred embodiments with reference to the drawings in which.

DESCRIPTION OF THE INVENTION

Figure 1:
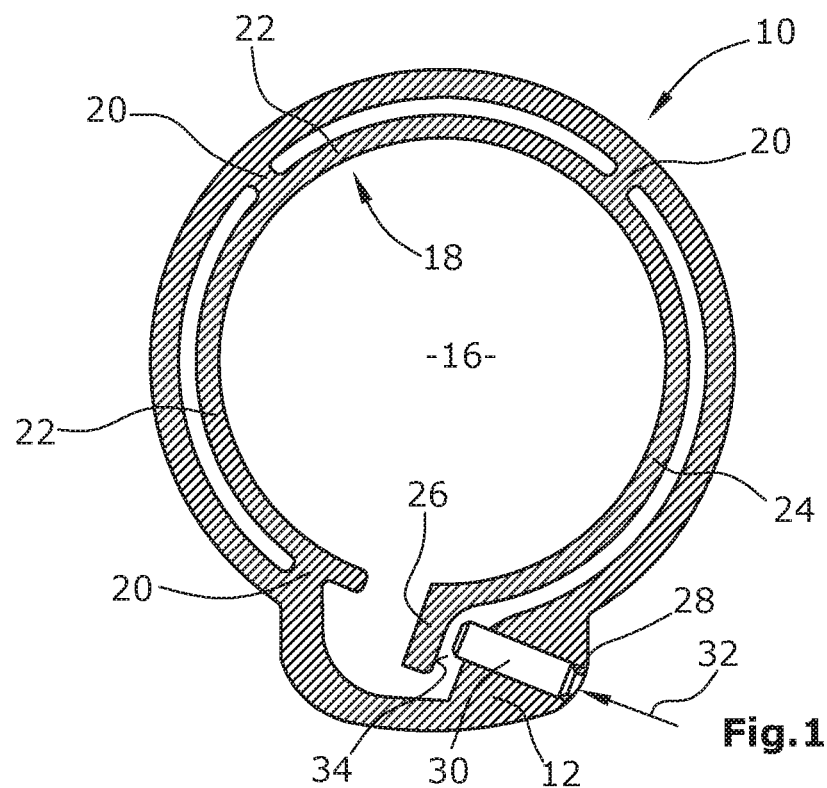
FIG. 1 shows a schematic top view of a first preferred embodiment of the bearing retaining element.

The bearing retaining element according to the invention for bicycle headset bearings includes a basic element 10. In the illustrated exemplary embodiment (FIG. 1), this is configured as a part of a ring and includes approximately ¾ of a ring. On the lower side in FIG. 1 the basic element 10 includes an accommodation projection 12, which is connected with the portion configured as a part of a ring of the basic element 10, via a connecting element 14. The basic element 10 thus has a closed contour. In the mounted state, the basic element 10 surrounds a steerer tube. The steerer tube is not illustrated in FIG. 1 but would extend perpendicularly to the drawing plane concentrically through an opening 16.

In the illustrated exemplary embodiment, the basic element 10 is connected with a clamping element 18 arranged inside the basic element 10 via three ribs 20. Between the ribs 20 the clamping element 18 includes ring-segment-shaped portions 22. In the illustrated exemplary embodiment, these are approximately ¼-ring-segments. Another ring segment 24 is connected with one rib 20 only and thus includes a free end. This is configured as a clamping projection 26.

In the accommodation projection 12 of the basic element 10 a through-going opening having a thread 28 is provided. A grub screw serving as a clamping means 30 can be screwed into this opening. By screwing the grub screw in the direction of an arrow 32 a clamping force is exerted onto a contact surface 34 of the clamping projection 26. Thereby the ring segment 24 is deformed such that a clamping-type fastening to the steerer tube is effected. Since the ring-segment-shaped portions 22, too, are connected with the basic element 10 only via ribs 20, the ring-shaped portions 22 are also elastically deformable such that they, too, rest upon the outside of the steerer tube. Thus a uniform clamping force is ensured.

The bearing retaining element illustrated in the top view of FIG. 1 has a small height and thickness, respectively, of possibly less than 5 mm.

Thus, for mounting purposes, the steerer tube is first inserted into the fork tube. Subsequently, the bearing retaining element is attached from above via the steerer tube, but not fixed. In a next step, the two headset bearings are adjusted and/or biased with the aid of the stem or another element which may be a tool. Once this adjustment has been performed the clamping means 30 of the bearing retaining element is tightened such that the bearing retaining element is clampingly fixed to the steerer tube. Subsequently, the stem or the tool used for adjusting the headset bearings can be removed, wherein the bearing retaining element ensures that the adjustment of the headset bearings is maintained.

Figure 2:
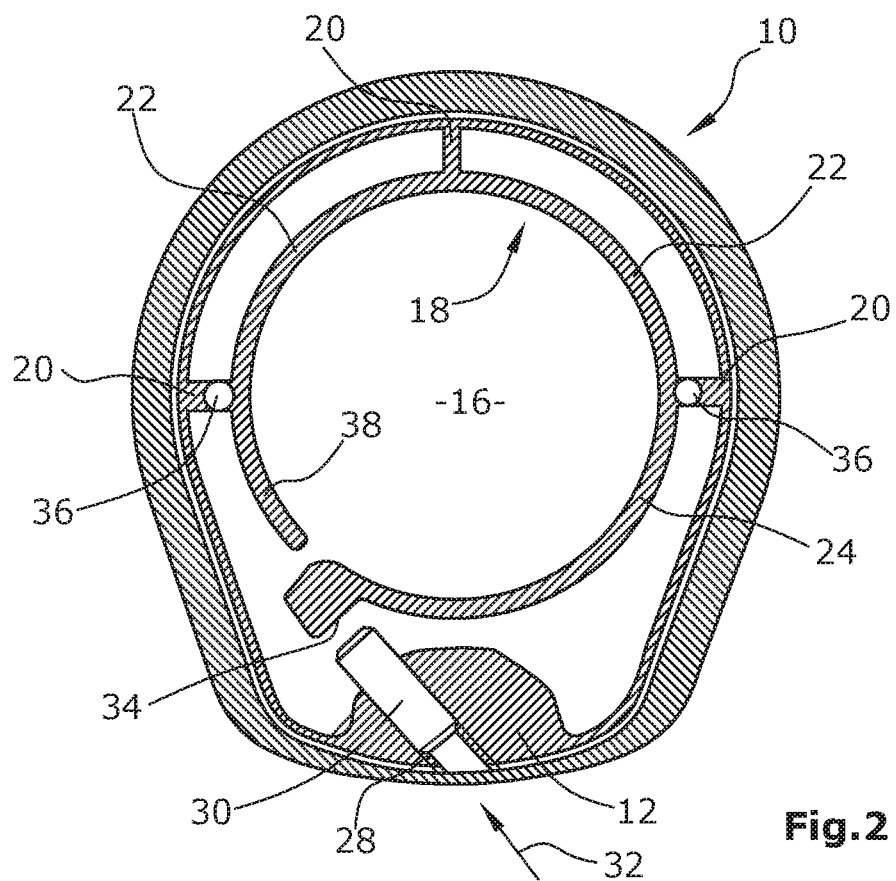
FIG. 2 shows a schematic top view of a second preferred embodiment of the bearing retaining element.

In the embodiment illustrated in FIG. 2 similar or identical components are designated by the same reference numerals. Essentially, the embodiment illustrated in FIG. 2 has the same components and the same functions. An essential difference is that two opposite ribs 20 additionally includes a hinge 36. Thereby an even more uniform distribution of the clamping force on the inside of the clamping element 18 is ensured.

In addition, the configuration of the basic element in the area of the accommodation projection 12 is slightly different such that the accommodation projection 12 is completely arranged inside a circumferential basic element 10. Further, the basic element 10 is configured such that it also serves as a cover for any bearing of the headset arranged below the basic element 10.

Another minor difference is that, besides the ring-segment-shaped portions 22 and the ring segment 24, the clamping element 18 includes another projection 38 extending beyond the left rib in FIG. 2.

The height of the bearing retaining element, as shown in FIG. 2, is also possibly smaller than 5 mm. The mounting is performed as described above on the basis of the bearing retaining element illustrated in FIG. 1, for example.

The invention claimed is:

1. A bearing retaining element for bicycle headset bearings, comprising
   a basic element which, in a mounted state, at least partly surrounds a steerer tube,
   a clamping element retained by said basic element, wherein the clamping element, in the mounted state, at least partly surrounds said steerer tube, and
   a clamping member connected with said basic element, wherein the clamping member acts upon said clamping element for clampingly fixing said clamping element to said steerer tube,
   wherein the basic element and the clamping element are formed integrally with each other.

2. The bearing retaining element according to claim 1, wherein the basic element has a closed contour which, in the mounted state, completely surrounds the steerer tube.

3. The bearing retaining element according to claim 1, wherein the basic element comprises an accommodation projection for accommodating the clamping member.

4. The bearing retaining element according to claim 3, wherein the accommodation projection defines a thread for accommodating the clamping member, and wherein the clamping member comprises a screw.

5. The bearing retaining element according to claim 1, wherein the clamping element comprises a clamping projection upon which the clamping member acts.

6. The bearing retaining element according to claim 5, wherein the clamping projection comprises a contact surface extending essentially perpendicularly to a clamping direction.

7. The bearing retaining element according to claim 1, wherein the clamping element is at least partly elastically deformable.

8. The bearing retaining element according to claim 1, wherein the clamping element is connected with the basic element via ribs.

9. The bearing retaining element according to claim 8, wherein at least one of the ribs comprises a hinge.

10. The bearing retaining element according to claim 4, wherein the clamping member comprises a grub screw.

11. A bearing retaining element for bicycle headset bearings, comprising
- a basic element which, in a mounted state, at least partly surrounds a steerer tube,
- a clamping element retained by said basic element, wherein the clamping element, in the mounted state, at least partly surrounds said steerer tube, and
- a clamping member connected with said basic element, wherein the clamping member acts upon said clamping element for clampingly fixing said clamping element to said steerer tube, and
- wherein the clamping element is connected with the basic element via ribs.

\* \* \* \* \*